United States Patent [19]

Banks, Jr.

[11] 3,804,045

[45] *Apr. 16, 1974

[54] PROCESS FOR PRODUCING MOLYBDENUM CUP WARES HAVING THIN INTERNALLY TAPERED SIDEWALLS

[75] Inventor: Neill K. Banks, Jr., Gloucester, Mass.

[73] Assignee: Bomco, Incorporated, Gloucester, Mass.

[ * ] Notice: The portion of the term of this patent subsequent to Aug. 22, 1989, has been disclaimed.

[22] Filed: Aug. 21, 1972

[21] Appl. No.: 282,152

Related U.S. Application Data

[63] Continuation-in-part of Ser. No. 858,681, Sept. 17, 1969, Pat. No. 3,685,475.

[52] U.S. Cl............................ 113/120 H, 148/11.5 F
[51] Int. Cl............................................. B21d 51/00
[58] Field of Search........ 72/69, 70, 83; 113/120 H; 148/11.5 F

[56] References Cited
UNITED STATES PATENTS

| | | | |
|---|---|---|---|
| 3,685,475 | 8/1972 | Banks | 113/120 |
| 2,921,875 | 1/1960 | Schnitzel et al. | 148/11.5 |
| 2,903,385 | 9/1959 | Revere et al. | 148/11.5 |
| 1,966,713 | 7/1934 | Flint | 72/69 |

OTHER PUBLICATIONS

Metals Handbook, 8th Ed., Vol. 2, American Society for Metals, 1964, pp. 267 & 268.

*Primary Examiner*—Lowell A. Larson
*Attorney, Agent, or Firm*—Barry R. Blaker

[57] ABSTRACT

Thin walled molybdenum cups having internally tapered sidewalls are formed by a particular metal spinning process, stress relieved and trimmed to finished length. The stress relieving step serves to mitigate strongly against deleterious lamination of the cups upon trimming thereof to their finished lengths.

7 Claims, No Drawings

PROCESS FOR PRODUCING MOLYBDENUM CUP WARES HAVING THIN INTERNALLY TAPERED SIDEWALLS

CROSS-REFERENCES TO RELATED APPLICATIONS

The present application is a continuation-in-part of my copending application Ser. No. 858,681, filed Sept. 17, 1969, now U.S. Pat. No. 3,685,475, issued Aug. 22, 1972.

BACKGROUND OF THE INVENTION

The present invention relates generally to the art of metal forming and is more particularly concerned with the fabrication of thin-walled molybdenum cups having internally tapered sidewalls, which cups are useful in the fabrication of hermetic metal to glass seals. In my parent application, the entire disclosure of which is intended to be incorporated herein by reference, there is disclosed a cold forming spinning process by which thin-walled tubular metallic cup shapes having internally tapered walls are fabricated. Said process comprises the provision of a heated divergently tapered mandrel over the end of which a relatively thicker walled cup-shaped metal workpiece is mounted in slip-fit or tighter relation. The workpiece, thus heated by contact thereof with the heated mandrel, is then forced, with relative axial and rotational motions, through the nip of at least one roller means spaced radially from the longitudinal axis of the mandrel, thereby to cause deformation and flow of the sidewalls of the workpiece. Each of the roller means employed is predominantly heated by one or more sources separate and distinct from the inherent heating thereof caused by contact of the roller means with the sidewalls of the heated and forming workpiece, thereby minimizing heat flux away from the workpiece.

The above-outlined metal forming method has been found to be extremely beneficial in the forming of thin and internally tapered sidewalls of cups composed of various metals, the formed wares being characterized by extremely accurate internal tapering of the sidewalls and by the excellent surface finish thereof. Said characteristics are particularly significant and beneficial with respect to molybdenum cups having thin internally tapered sidewalls, which cups presently find extensive usage in the production of metal to glass hermetic seals. Further details relating to exemplary metal cup/glass seals can be had by reference to U.S. Pat. No. 3,435,180, Kershaw, Mar. 29, 1969.

In employing the process of my parent application in the preparation of molybdenum cups having thin, internally tapered sidewalls one of the difficulties heretofore encountered has been the tendency of a significant number of cups of any particular forming run to "laminate" upon trimming of the semi-finished cup to its finished length. Said "lamination" phenomenon is expressed visually as a severe roughening of the trimmed edge of the mouth of the cup and, upon close examination, the roughened edge is often seen to comprise a large number of cracks through the thin sidewall thereof and a number of separate metal layers or "laminae" oriented in a generally circumferential manner about the mouth of the cup. I have now discovered that the cause of this deleterious phenomenon, which can destroy the suitability of the finished cup for hermetic metal to glass seal applications, apparently resides in internal stresses generated during formation of the semi-finished ware and which stresses often tend to be relatively enormous with respect to the thickness and strength of the cup sidewall at the intended level of the mouth thereof. Thus, upon trimming of the cup to finished length, said internal stresses would appear to be suddenly relieved with attendant renting of the cup mouth in the manner hereinbefore described. In accordance with the present invention, however, lamination upon trimming of molybdenum cups formed by the process of my parent application has been markedly reduced or eliminated substantially entirely.

OBJECTS OF THE INVENTION

It is a principal object of the invention to provide a novel metal forming process by which molybdenum cups having thin internally tapered sidewalls are produced.

It is another object of the invention to provide a novel metal forming process for the production of molybdenum cups having thin internally tapered sidewalls wherein lamination of the mouths of such cups upon trimming thereof to finished length is substantially reduced or eliminated.

Other objects and advantages of the present invention will in part be obvious and will in part appear hereinafter.

SUMMARY OF THE INVENTION

In accordance with the present invention it has been discovered that the incidence of deleterious lamination upon trimming of semi-finished molybdenum cups having thin internally tapered sidewalls and which cups have been produced by spinning of a relatively thicker walled workpiece over a tapered mandrel in accordance with the method of my parent application is markedly reduced when, subsequent to the spinning step and prior to the trimming step, said semi-finished cups are subjected to a stress relieving treatment under an inert or reducing atmosphere.

DETAILED DESCRIPTION OF THE INVENTION

As mentioned previously the particular metal forming process by which suitable semi-finished molybdenum cups having thin, internally tapered sidewalls are produced for use in the present invention is fully disclosed in cross-referenced U.S. Pat. No. 3,685,475, the disclosure of which is specifically incorporated herein by reference.

In the practice of the process of the present invention the semi-finished molybdenum cups produced in accordance with the method of my parent application are stress relieved prior to trimming to finished length by treatment thereof at temperatures of between 950°C and 1,150°C in an inert or reducing atmosphere. While the precise minimum time required for the stress relieving step in any particular case will, in large part, be dictated by such considerations as the severity of cold working accomplished during the spinning or forming step and the dimensions of the semi-finished cup, I have generally found that sufficient stress relieving is accomplished for thin walled molybdenum cups having a maximum sidewall thickness of about 0.025 inch under a treatment regimen of between 950°C to 1,150°C for a period ranging between 5 and 15 minutes. My preferred stress relieving temperature is between 1,000°C and 1,150°C. Further, as mentioned, the atmosphere under which the stress relieving step is accomplished should be either inert or reducing in order to mitigate against the formation of scale on the surfaces of the semi-finished molybdenum cup. Preferably the stress relieving atmosphere is reducing in nature and most preferably comprises wet or dry hydrogen.

Having accomplished the stress relieving step it is then only necessary to trim the semi-finished molybdenum cup to its finished length by any conventional method, such as by grinding, shearing, cutting, slitting, facing off, sawing, parting and the like. For instance, the semi-finished stress relieved cups can be trimmed to the desired finished lengths by slitting transversely therethrough with a thin abrasive wheel, sawing with a thin fine-toothed saw, facing off in a lathe, filing, etcetera. Generally speaking, however, I prefer that the trimming step be achieved by shearing of the semi-finished stress relieved cup. This can be conveniently achieved by mounting the cup over a stepped tool steel mandrel, rotating the mandrel/cup assembly and applying, with pressure, a beveled edge cutting wheel against the exterior surface of the cup. This last mentioned trimming method, therefore, is quite similar in operations to conventional thin wall tube cutting devices with the exception that in my preferred trimming method, the interior surface of the semi-finished cup is supported by the mandrel residing therewithin.

Exemplary of the improvement resulting from the practice of the present invention I have produced semi-finished molybdenum cups having thin internally tapered sidewalls by the process of my parent application and, without employing the stress relieving step of the instant invention, have suffered losses of between about 5 and 10 percent upon trimming of such cups to finished length, said losses being due solely to the problem of lamination of the cup mouths at the trimmed edges thereof. On the other hand, with no change in overall operations with the exception of the additions of the stress relieving step prior to the trimming of the semi-finished cups (said stress relieving being accomplished at a temperature of about 1,050°C for a period of about 10 minutes under a wet hydrogen atmosphere), finished cup losses due to lamination of the cup mouth upon trimming were virtually completely eliminated.

What is claimed is:

1. A process for producing molybdenum cups having thin internally tapered sidewalls, which process comprises:

A. i. mounting a relatively thicker-walled cup-shaped molybdenum workpiece in at least slip-fit relationship over the tip of a mandrel comprising a divergently tapered, continuous metalworking surface;

ii. indirectly heating said workpiece by heating said mandrel;

iii. providing at least one heated roller means spaced from the divergently tapered, continuous metalworking surface of said mandrel whereby a nip of smaller dimension than the thickness of said thicker-walled molybdenum workpiece is provided, the major portion of the heating of each said roller means being derived from a source other than said heated workpiece;

iv. cold forming said workpiece by causing relative motions of the resulting heated mandrel/heated workpiece assembly with respect to said heated roller means, said motions comprising (a) axial motion of said assembly through said nip, and (b) rotational motion between said assembly and said roller means;

B. stress relieving the semi-finished ware of (A) in an inert or reducing atmosphere and at a temperature of between 950°C and 1,150°C; and C. trimming the mouth of the semi-finished and stress relieved cup ware of (B) to finished length.

2. The process of claim 1 wherein said stress relieving step of (B) is accomplished in a reducing atmosphere.

3. The process of claim 1 wherein said stress relieving step of (B) is accomplished in a hydrogen atmosphere.

4. The process of claim 1 wherein said stress relieving step of (B) is accomplished at a temperature of between 1,000°C and 1,100°C.

5. The process of claim 1 wherein said semi-finished ware of (A) has a maximum sidewall thickness of less than about 0.025 inch and is stress relieved in step (B) for a period of between 5 and 15 minutes.

6. The process of claim 1 wherein said trimming of step (C) is accomplished by shearing off the excess length of the mouth of the semi-finished and stress relieved molybdenum cup.

7. The process of claim 6 wherein said shearing is accomplished by supporting the interior of the semi-finished stress relieved cup on a mandrel and applying a beveled edge cutting wheel against the exterior surface of said cup while rotating the mandrel/cup assembly.

* * * * *